United States Patent [19]
Ernsberger et al.

[11] Patent Number: 5,375,860
[45] Date of Patent: Dec. 27, 1994

[54] RECYCLING CART

[75] Inventors: Ronald E. Ernsberger, Fort Wayne; Richard M. DeLucenay, Garrett, both of Ind.

[73] Assignee: Fort Wayne Pools, Inc., Fort Wayne, Ind.

[21] Appl. No.: 661,670

[22] Filed: Feb. 27, 1991

[51] Int. Cl.$^5$ .............................................. B62B 3/00
[52] U.S. Cl. .............................. 280/47.35; 220/909; 248/907
[58] Field of Search ............... 280/47.19, 47.35; 248/907; 220/23.4, 23.83, 909, 507, 410

[56] References Cited

U.S. PATENT DOCUMENTS

| | | | |
|---|---|---|---|
| 247,316 | 9/1881 | Crane | 220/524 |
| 581,322 | 4/1897 | Winters | 220/334 |
| 992,006 | 9/1911 | Kubersky et al. | 220/531 |
| 1,281,587 | 10/1918 | Kovachevich | 220/408 |
| 2,597,544 | 5/1952 | Swain | 280/47.19 |
| 3,904,218 | 9/1975 | Kostic | 220/79.2 |
| 4,114,776 | 9/1978 | Pluss | 220/22 |
| 4,357,029 | 11/1982 | Marini et al. | 280/47.19 |
| 4,771,907 | 9/1988 | Torney | 220/23.83 |
| 4,821,903 | 4/1989 | Hayes | 220/1 |
| 4,834,253 | 5/1989 | Crine | 220/1 T |
| 4,878,592 | 11/1989 | Lee | 220/23.83 |
| 4,893,722 | 6/1990 | Jones | 220/1 |
| 4,905,853 | 3/1990 | Strawder | 220/1 T |
| 4,988,010 | 1/1991 | Pollak | 220/23.83 |
| 5,035,563 | 7/1991 | Mezey | 220/909 |
| 5,044,644 | 9/1991 | Duran et al. | 280/47.35 |

FOREIGN PATENT DOCUMENTS

| | | | |
|---|---|---|---|
| 965814 | 4/1975 | Canada | 280/47.35 |
| 194339 | 9/1986 | European Pat. Off. | 220/909 |
| 3524781 | 1/1987 | Germany | 220/909 |
| 3531554 | 3/1987 | Germany | 220/909 |

*Primary Examiner*—Eric D. Culbreth
*Attorney, Agent, or Firm*—Baker & Daniels

[57] ABSTRACT

A recycling cart for the segregated storage of refuse materials is provided. The cart comprises a wheeled frame member including a lower platform and further including an upper framework that has openings therein into which open topped refuse containers may be inserted and removed. At least one of the containers has a bottom surface supported on the platform. At least one other container has lips extending along the periphery of its open top which engage the upper frame member so that the container is suspended from the frame member. The recycling cart may be formed from 100% recyclable material.

2 Claims, 4 Drawing Sheets

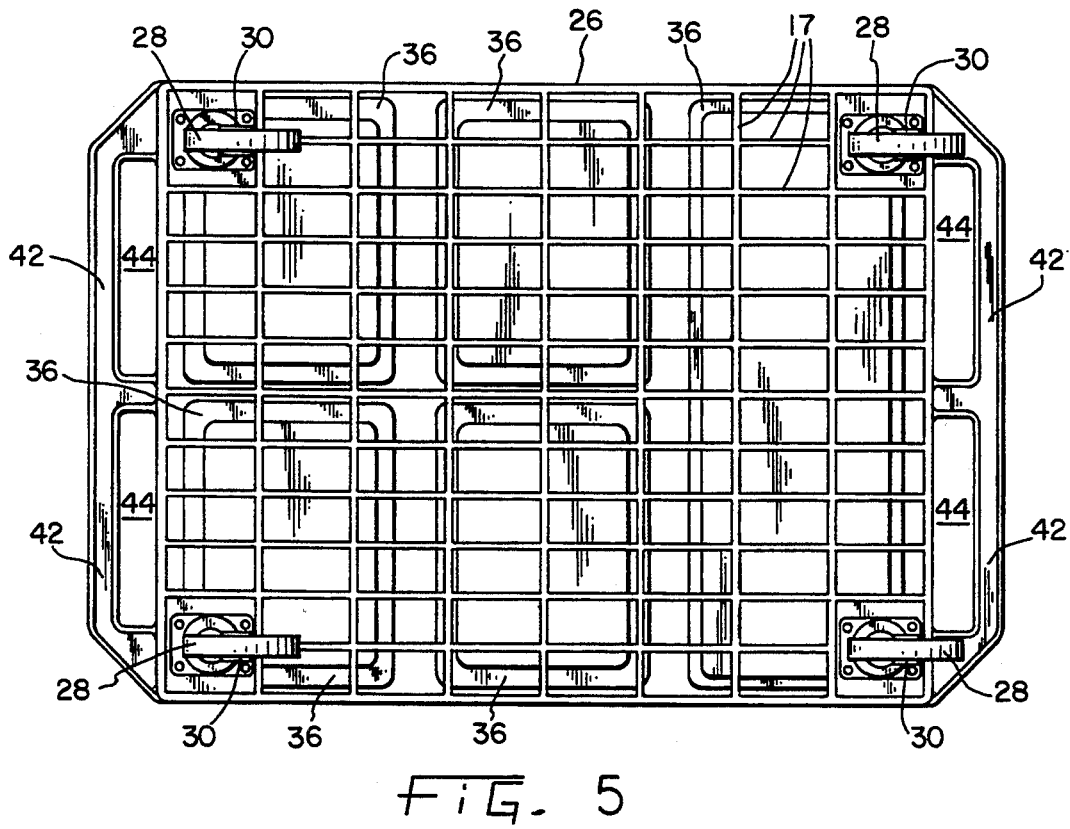
FIG. 5
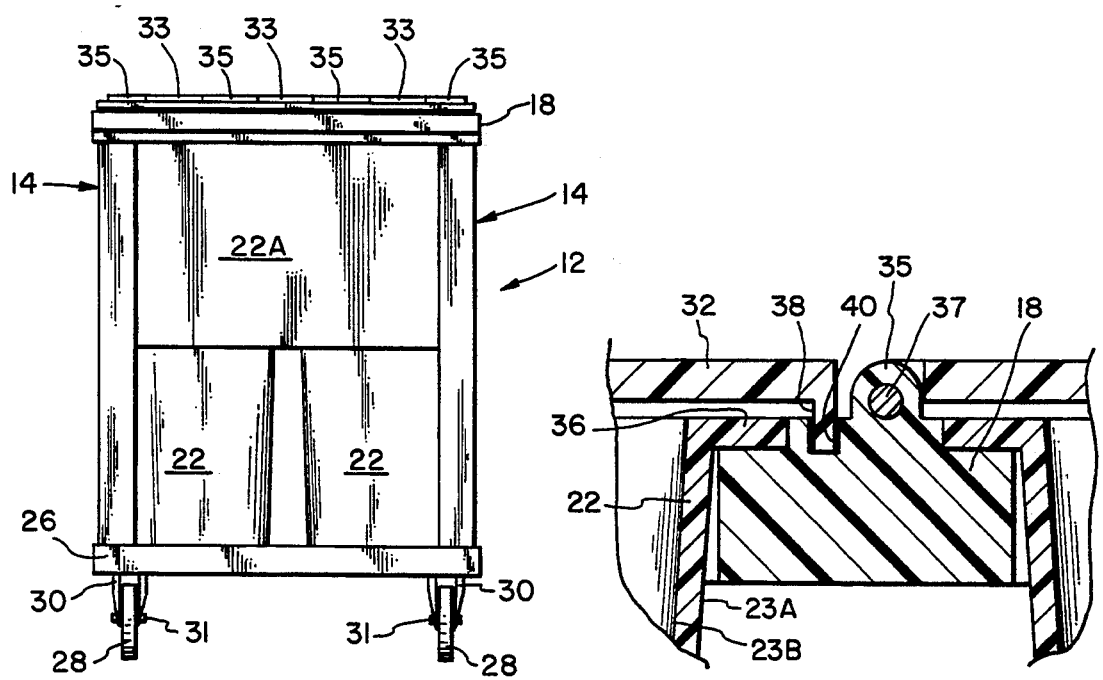
FIG. 6
FIG. 7

RECYCLING CART

BACKGROUND OF THE INVENTION

The present invention relates generally to an apparatus for storage of refuse materials, and more particularly to a recycling cart wherein different types of refuse materials may be stored in separate containers carried by the cart.

In recent years the practice of reusing, or recycling, previously used materials has taken on increased importance. There is now an increased awareness on the part of the populace that the depletion of our natural resources cannot continue indefinitely at the present pace without eventually exhausting our supply of many of these resources. In addition, there is an increased awareness that existing landfills are fast becoming filled to capacity with trash and other materials that have been routinely, and often needlessly, discarded. Concomitantly, the space available for new and expanded landfills has decreased as a result of not only logistical concerns, but also political concerns.

In the recent past, attempts have been made to confront the above problems by decreasing both the type and amount of refuse material that had previously been routinely earmarked for disposal. An old concept that is again coming to the forefront is that of recycling. However, the widespread implementation of recycling has been hampered in the past for many reasons. For example, in order for a material to be recycled, it is necessary to find a use for the material which does not add an unreasonable cost to an item produced therefrom. Manufacturers are often willing to use recycled materials in their products, and the consuming public is often willing to purchase materials made from recycled materials, if they can be reasonably assured that products made from these materials are of a satisfactory quality. In order to manufacture such products having an acceptable quality, it is generally necessary that the materials to be recycled be substantially free of foreign materials and impurities. Accordingly, in order to establish a viable market for recycled materials, it is desirable to segregate these materials from incompatible materials and other foreign substances.

Depending upon the particular end use for the recycled material, these separation requirements can be relatively simple. On the other hand, they can also be quite extensive. For example, it is well known that glass must be separated from plastic in order to attract a market for either the used glass or the used plastic. Often, however, this type of separation is not the end of the line and many species must be further separated within a generic group, such as the separation of aluminum from other metals or even the separation of clear glass from colored glass. If the separation is done at the end of the line, in other words at the landfill or disposal point of the refuse material, an extra expense is added to the recycling process. Similarly, if the separation is performed by refuse collection personnel at the point of collection, the additional time expended by these personnel in this separation adds a similar expense to the process. This additional expense in many cases may mean the difference between a cost effective recycling process and one that is cost prohibitive.

In order to avoid this additional cost, it is desirable to have the consumer separate the recyclable materials prior to collection. To encourage the consumer to separate the refuse materials, and to provide him with a convenient and effective means to accomplish this result, it is desirable to provide a device that minimizes any inconvenience experienced in separating the recyclable materials. Such a device should not occupy an unduly large amount of space, and should be amenable to the segregation of many types of refuse material. Additionally, the device should be sanitary and easy to clean. The device should also be sturdy enough to withstand a long period of use by the consumer, and the rough treatment often given to refuse containers by refuse collection personnel.

Devices in this general category are known in the prior art. For example, U.S. Pat. No. 4,821,903 describes a trash bin cart wherein a plurality of generally similarly-sized rectangular bins are aligned side-by-side on a metal cart. The individual trash bins are covered by a common lid, and have a handle located at a front portion. U.S. Pat. No. 4,878,592 describes a multi-compartment trash container that includes an outer container having a plurality of individual receptacle units situated within and supported on the bottom of the container. Various other containers of this general type are described, for example, in U.S. Pat. Nos. 4,905,853, 4,834,253, and 1,281,587.

It is desired to provide a recycling cart for the segregated storage of different types of refuse materials wherein the cart may be easily cleaned, is easily maneuverable, is relatively compact, is made of sturdy materials and is amenable to the storage of numerous types of refuse materials.

SUMMARY OF THE INVENTION

Accordingly, there is provided a novel recycling cart for the segregated storage of different types of refuse materials.

In a preferred embodiment, the cart comprises a wheeled frame member having a plurality of open topped refuse containers. The containers are insertable into and removable from the frame member through openings in the upper framework of the frame member. The containers may be sized according to the particular type of refuse material, such as newspapers and plastics, that is to be stored in the particular container. The containers and frame member may be formed from 100% recycled material, which also contributes to the solution of the problem of solid waste. A separate cover may be utilized for each refuse container, or alternatively, a common cover may be used for a plurality of containers.

An advantage of the recycling cart of the present invention is that it provides an apparatus for the segregated storage of different types of refuse materials.

Another advantage of the present invention is that it provides a recycling cart that is of sturdy construction, is of relatively compact size, and is easily maneuverable from one location to another.

Yet another advantage of the present invention is that it provides a recycling cart that may be easily cleaned and will not rust.

A further advantage of the present invention is that it provides a recycling cart that includes containers that may be interchanged with one another, and that may be replaced with containers having a greater or lesser capacity according to the requirements of the user.

A still further advantage of the present invention is that the refuse containers do not require paper or plastic liners, thus eliminating an additional source of scrap material.

Another advantage of the present invention is that the refuse containers are watertight, and will not absorb water or annoying odors.

Yet another advantage of the recycling cart of the present invention is that it may be formed from 100% recycled material, thus providing a potential use for recycled material.

In one form thereof, the invention comprises an apparatus for segregated storage of different types of refuse materials. The apparatus includes a frame member having an upper framework and a lower platform. The upper framework has a plurality of openings. A plurality of open topped refuse containers is provided for storage of the refuse materials. The refuse containers are sized and configured for insertion and removal through respective openings in the upper framework. At least one of the containers has a bottom surface that is supported on the platform. At least one other container has lips extending outwardly substantially along the periphery of the open top of the container. The lips are arranged to engage the upper framework of the frame member when the container is inserted through an opening, so that the container is suspended from the upper framework. A cover is provided that is engaged with the upper framework for selectively covering and uncovering the open tops of the refuse containers.

The invention, in accordance with another embodiment thereof, provides a recycling cart comprising a frame member that includes a lower platform and an upper framework having a plurality of openings. The lower platform has an upper support surface and has casters on an underside thereof for permitting movement of the cart from place to place. A plurality of open topped refuse containers is provided for segregated storage of different types of refuse materials. The refuse containers are sized and configured for insertion through respective openings in the upper framework and removal therefrom. At least one of the containers is sized so that a bottom portion of the container is supported on the support surface when the container is inserted through one of the openings in the upper framework. At least one other container has lips extending outwardly substantially along the periphery of the open top of the container. The lips are arranged to engage the upper framework of the frame member when the container is inserted through an opening so that the container is suspended therefrom. Cover means engaged with the upper framework are provided for selectively covering and uncovering the open tops of the respective refuse containers.

BRIEF DESCRIPTION OF THE DRAWING

The above mentioned and other features and objects of this invention, and the manner of attaining them, will become more apparent and the invention itself will be better understood by reference to the following description of embodiments of the invention taken in conjunction with the accompanying drawings, wherein:

FIG. 5 is a bottom view of the recycling cart shown in FIG. 1;

FIG. 6 is an end elevational view of the recycling cart of the present invention viewed from the right side of FIG. 1;

FIG. 7 is a sectional view taken of a portion of FIG. 2 showing the interlock between a flange of the cover member and a groove in the upper framework of the frame member.

Figure 1:
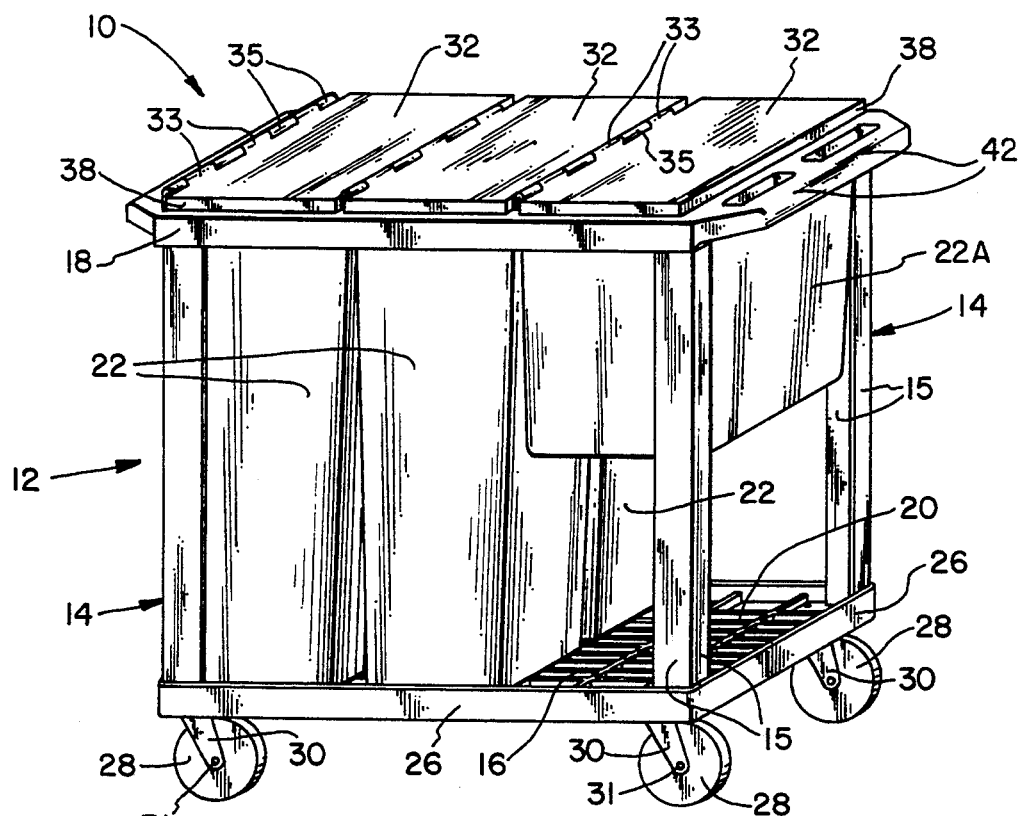
FIG. 1 is a front perspective view of a recycling cart according to the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring now to the drawings, and particularly to FIG. 1, there is shown a recycling apparatus 10 for the segregated storage of different types of refuse materials. Recycling apparatus 10 comprises a cart 10 which includes frame member 12, having a plurality of upstanding legs 14, a lower platform 16 and an upper framework 18. Platform 16 includes upper support surface 20 for supporting one or many open topped refuse containers 22. Upper framework 18 includes a plurality of openings 24 (FIG. 8) through which containers 22 may be inserted and/or removed from recycling cart 10. Refuse containers 22 may be of different sizes whereby certain of containers 22 extend lengthwise from openings 24 to upper support surface 20 of lower platform 16, while certain other containers 22A have a much shorter length, and are suspended from upper framework 18 in a manner to be described hereinafter.

Generally, containers 22 have a width of slightly less than one-half of the width of frame member 12 (viewed from the right side of FIG. 1) so that two containers may be aligned side-by-side in cart 10. This arrangement is shown in FIGS. 1, 2, 5 and 6, respectively. Alternately, containers 22 may be sized so that only one container extends substantially the entire width of recycling cart 10. Container 22A, best shown in FIGS. 1 and 8, preferably extends substantially the entire width of cart 10. The dimensions of the respective containers shown in the drawings represents a preferred embodiment; however it should be understood that alternate dimensions of containers 22 and 22A may similarly be utilized without departing from the scope of the invention. The particular size of container 22 utilized will generally depend on the material to be collected in that container. For instance, it is expected that container 22A will be used for the collection of newspaper. Therefore, this container is sized so that newspapers may be stacked therein in a manner that allows for easy retrieval of the newspapers when they are removed from the container. A paper bag may be used as a liner for this container, which provides added convenience in removing the newspapers. Preferably, the remaining containers will be sized as shown in the drawings, however, as stated, varying sizes of containers may be utilized according to the particular needs of the user.

Preferably, legs 14 comprise two generally rectangular support portions 15 that meet at right angles to form an outer border of cart 10, and to impart additional strength to legs 14. As shown in FIG. 1, corner portions of the outermost of containers 22 and/or 22A bear against legs 14 and are generally bounded thereby.

In a preferred embodiment, platform 16 is formed of generally perpendicular supporting strips 17 arranged in a lattice-type pattern (FIGS. 1 and 5). Platform 16 may include outer border 26 which is raised above the level of support surface 20 of platform 16. Bottom portions of containers 22 may thereby be retained within the periphery of border 26 of platform 16. Additionally, border 26 prevents miscellaneous items that may be stored on platform 16 from sliding off of recycling cart 10 when the cart is moved. Swivel-type casters 28 may be affixed to the underside of platform 16 at each of its corners by brackets 30 and pins 31, so that recycling cart 10 may be moved from place to place.

Upper framework 18 includes a plurality of cover members 32 for containers 22, 22A. Preferably, individual cover members 32 are generally rectangular and extend virtually the entire width of frame member 12. In the preferred embodiment shown in FIG. 1, each cover member 32 covers the respective open tops of two refuse containers 22, with the exception of the cover member covering "extra-wide" container 22A. Similarly, alternate configurations may be substituted for this arrangement. For example, a separate cover member 32 may be provided for each refuse container 22. Likewise, a common cover member 32 may be utilized to cover the entire recycling cart, and therefore, all of the containers.

Figure 8:
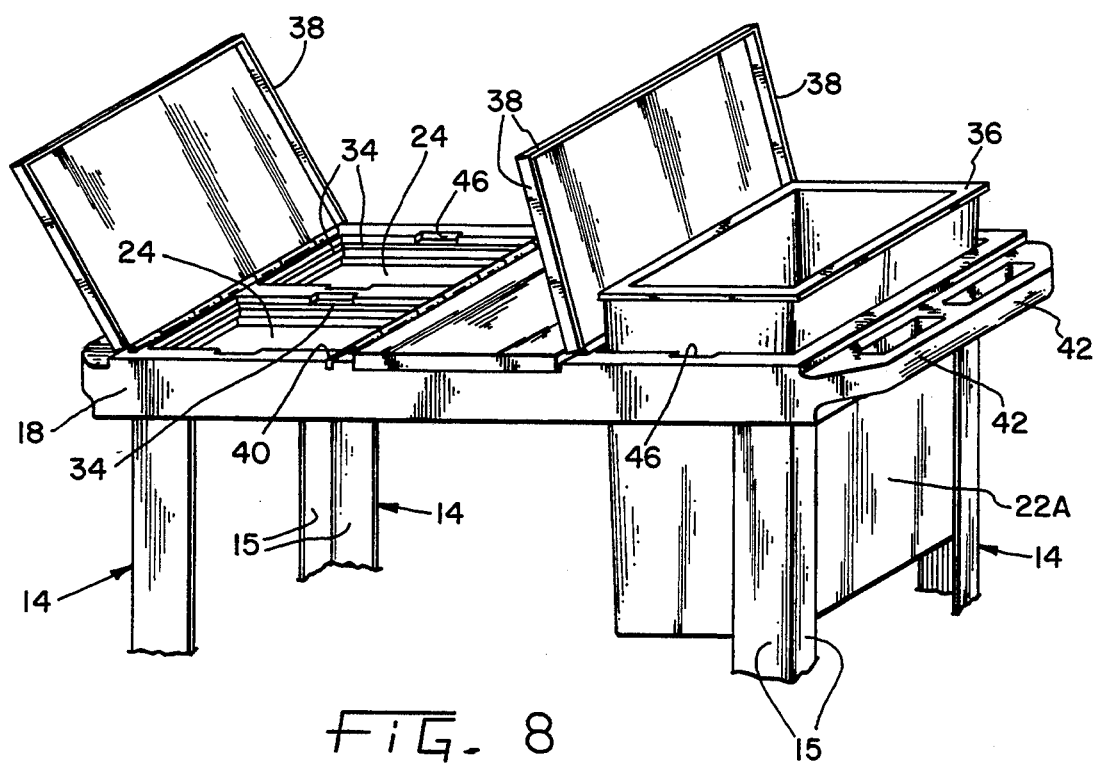
FIG. 8 is a perspective view of an upper portion of the recycling cart showing additional structure of the upper framework and the openings therein, and showing a refuse container partially removed from the frame member.

As stated previously, upper framework 18 includes a plurality of openings 24 through which refuse containers 22 are inserted and/or removed from cart 10. As shown in FIG. 8, ledge 34 protrudes from framework 18 into each of openings 24, and extends generally around the periphery of each of said openings. Lips 36 extending outwardly substantially along the periphery of the open top of container 22, 22A are sized and positioned to engage ledge 34 after a container has been inserted through opening 24. This arrangement is particularly favorable with a refuse container, such as container 22A, that is not of sufficient length to be supported on lower platform 16. In this case, container 22A is suspended from ledge 34. The arrangement, however, is also favorable with containers 22 that extend to and are supported by lower platform 16 due to the additional support that is provided to the containers while they are positioned within frame member 12.

Figure 3:
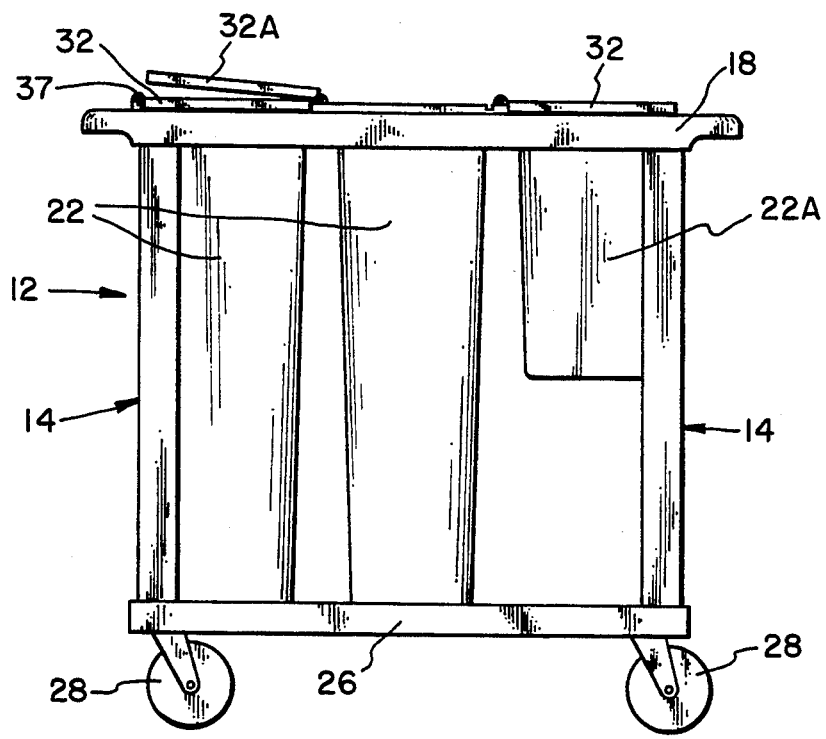
FIG. 3 is a front elevational view thereof showing a different one of the cover members in an open position.
Figure 4:
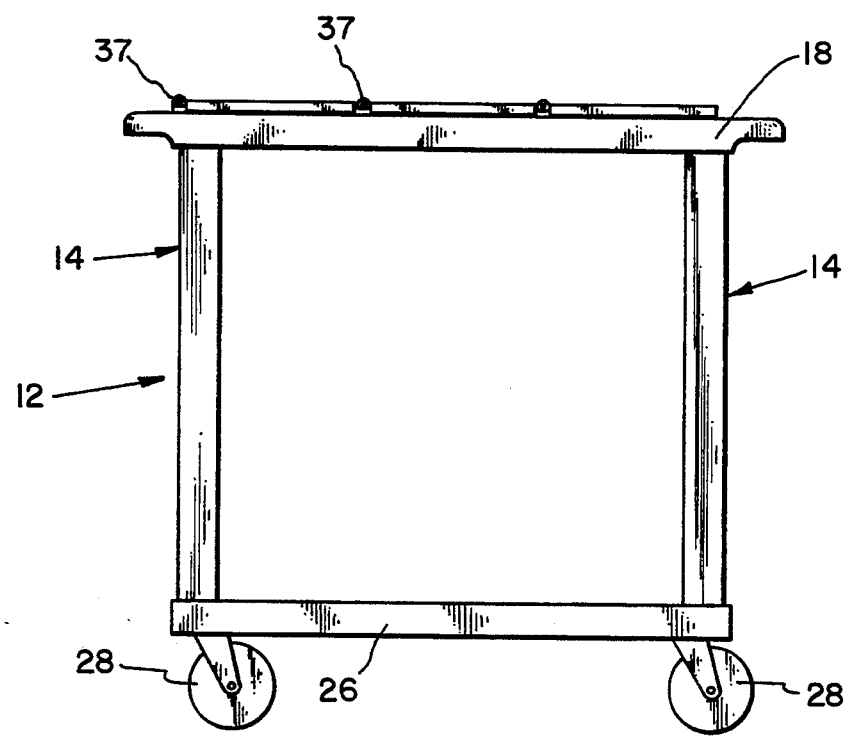
FIG. 4 is a front elevational view as in FIG. 3, wherein the refuse containers have been removed and all of the cover members are in the closed position.

Cover members 32 are hingedly connected to the top surface of upper framework 18 independently of refuse containers 22, as shown in the drawings. Hinge portions 33, provided at an edge of respective cover members 32, hingedly engage hinge portions 35 by way of rods 37. Hinge portions 35 project upwardly from upper framework 18 (FIGS. 1, 3, 4, 6, 7). The covers are hinged such that they will pivot sufficiently far to remain open when refuse material is being loaded into a container, without the necessity of the covers being manually held open. As shown in FIG. 3, cover member 32A is pivoted nearly 180 degrees from a closed position to an open position. After a cover member has been manually pivoted in excess of 90 degrees, the cover member will thereafter remain open until it is manually closed. The remaining cover members 32 are shown in FIG. 3 in the closed position. The axis for the pivot of the hinge is located sufficiently high so that one cover member will not interfere with the ability of the cover member to its immediate right (when the containers and cover members are aligned as shown in FIG. 1) to be opened. This arrangement is shown, for example, in FIGS. 1, 3, 4 and 6.

As best illustrated in FIG. 8, cover members 32 may also include flange portions 38. Flange portions 38 are directed downwardly when cover members 32 are in the closed position (FIG. 1), and are sealingly received in grooves 40 formed in the upper surface of upper framework 18 as best shown in FIG. 7. Upper framework 18 of frame member 12 may also include handles 42. Handles 42 are formed by respective cavities 44 in framework 18. Cavities 44 are of sufficient size so that the user may insert a hand around each of handles 42 for pushing or pulling cart 10 from place to place. Preferably, two handles 42 are located at each end of cart 10 as shown in embodiment depicted in the drawings.

Figure 2:
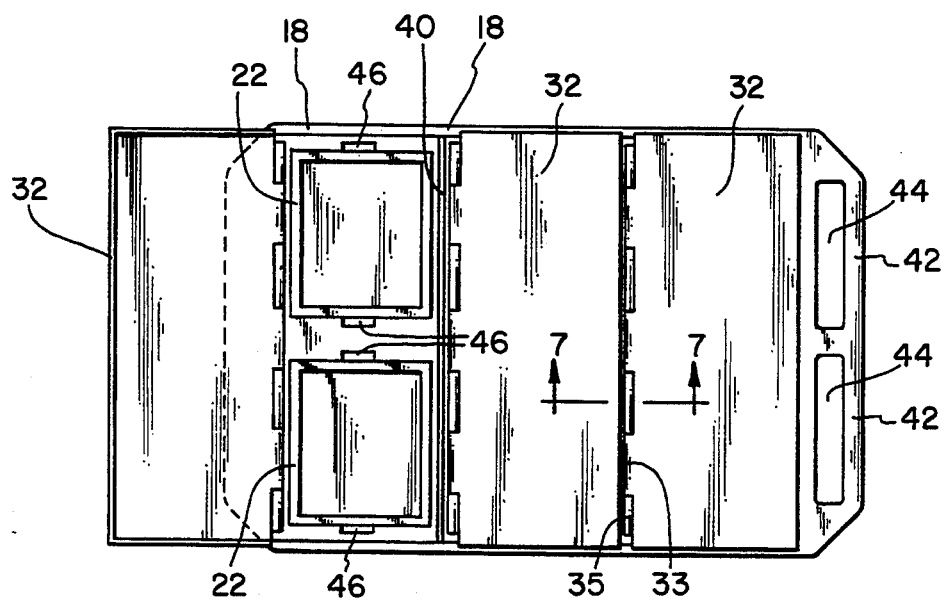
FIG. 2 is a top plan view of an embodiment of the present invention showing one of the cover members in an open position.

Upper framework 18 may also include hollowed portions 46. Preferably, a separate hollowed portion 46 is provided on each side of framework opening 24, as shown in FIGS. 2 and 8. Each hollowed portion 46 is sized and configured so that a user may insert a hand into hollowed portion 46, for ease in lifting the container into or out of recycling cart 10. Preferably, a radius is added to all corners of cart 10, as well as to the intersection of the individual parts in order to impart additional strength to the structure.

If desired, upper framework 18 may be removable from frame member 12 and may be replaced by an upper framework having a different number of openings. Upper framework 18 could be formed, as is apparent to those skilled in the art, to detachably engage the upstanding legs 14 at the inner surface of upper framework 18 and rigidly but detachably fasten the upstanding legs 14 to the upper framework 18 by common fastening means. In this manner, different combinations of containers may be utilized with frame member 12 than the particular combination shown in the drawings. The possibility of utilizing containers 22 of different sizes expands the range of potential uses of cart 10 to other uses, such as a laundry cart.

Preferably, the frame, cover and containers are all made from 100% reclaimed material, such as reprocessed or reground structural foam molded thermoplastic material. Examples of thermoplastics that may be utilized are high density polyethylene, copolymer polypropylene and homopolymer polypropylene. These materials are listed by way of example only, and are not intended to limit in any way the scope of the invention alone. This type of material is strong and rigid and will not rust or absorb water, and may be easily cleaned by means of a garden hose. The containers are also watertight.

In an alternative embodiment, such as shown in FIG. 7, the containers 22 may be formed of structural foam molded thermoplastic material having an inner layer of foamed plastic bounded at the outer surface thereof by two generally smooth outer skin layers 23A and 23B. Moreover, in another embodiment (not shown), frame member 18 and containers 22 may be similarly formed using conventional molding techniques e.g., injection molding, to define an inner layer of foamed plastic bounded at the outer surface thereof by two generally smooth outer skin layers.

In a preferred embodiment, separate full length containers 22 may be provided on cart 10 for aluminum, glass, metal and plastic. Shortened container 22A may be provided for newspapers. Alternatively, if it is desired to further segregate refuse materials into additional categories, a larger cart having the capability to carry additional containers may be utilized. Of course, this same advantage may also be obtained simply by using more than one recycling cart. With this additional storage capacity, certain materials such as glass, plastic and metals can be further separated according to their properties and intended uses.

Accessories, such as a can crusher, may also be attached to cart 10. As an additional feature, the cover members may be molded with the name of the material to be deposited into the container, i.e. GLASS, PLASTIC, METAL, ALUMINUM, NEWSPAPER, etc. Similarly, advertising material, logos or similar information may be molded into or otherwise attached to the frame member or the containers.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for segregated storage of different types of refuse materials, comprising:

a frame member, said frame member including an upper framework having a plurality of openings and including a lower platform;

a plurality of open topped refuse containers for storage of refuse materials, said refuse containers being sized and configured for insertion through respective openings in said upper framework and removal therefrom, at least one of said containers extending from said upper framework to said lower platform and having a bottom surface supported by said lower platform, at least one other of said containers having a shorter length and lips extending outwardly substantially along the periphery of the open top of the container, said lips being arranged to engage the upper framework of the frame member when the container is inserted through an opening so that the container is suspended therefrom, all of said containers being simultaneously accessible;

cover means engaged with said upper framework for selectively covering and uncovering the open tops of the refuse containers, said cover means comprising a plurality of cover members arranged such that each cover member covers the open top of at least one of said refuse containers, the cover members being hingedly connected to said upper framework, each of said cover members being pivotable along an axis from a closed position wherein the cover member covers the open top of at least one container to an open position wherein the cover member is pivoted along said axis in excess of 90 degrees from said closed position; and each of said cover members including a downwardly directed flange portion situated substantially along the periphery of the cover member, wherein at least a part of said downwardly directed flange portion is received in a corresponding groove formed in said upper framework and aligned with said flange portion when the cover member is in the closed position so that a seal is formed therebetween.

2. A recycling cart, comprising:

a frame member, said frame member including an upper framework having a plurality of openings and including a lower platform, said lower platform having an upper support surface and having casters on an underside thereof for permitting movement of the cart from place to place;

a plurality of open topped refuse containers for segregated storage of different types of refuse materials, said refuse containers being sized and configured for insertion through respective openings in said upper framework and removal therefrom, at least one of said containers extending from said upper framework to said upper support surface and having a bottom surface supported by said support surface when said container is inserted through one of said openings in said upper framework, at least one other of said containers having a shorter length and lips extending outwardly substantially along the periphery of the open top of said container, said lips being arranged to engage said upper framework of the frame member when the container is inserted through an opening so that the container is suspended therefrom, all of said containers being simultaneously accessible; and cover means engaged with said upper framework for selectively covering and uncovering the open rods of the respective refuse containers, said cover means comprising a plurality of cover members wherein each of said cover members is sized and positioned to cover the open top of at least one refuse container, each said cover member having a generally rectangular cover surface hingedly connected along an edge thereof to said upper framework, said cover member being pivotable along an axis from a closed position wherein the cover member covers the open top of at least one refuse container to an open position wherein the cover member is pivoted along said axis a distance of greater than ninety degrees from said closed position, said generally rectangular cover surface including a downwardly directed flange portion situated along an edge of said cover surface generally opposite said hingedly connected edge, said downwardly directed flange portion being received in a groove formed in said upper framework and aligned with said flange portion when the cover member is in the closed position so that said flange portion and said groove form a seal for the refuse container.

* * * * *